US012787139B2

(12) United States Patent
Hirayama

(10) Patent No.: US 12,787,139 B2
(45) Date of Patent: Nov. 3, 2026

(54) LIGHTING APPARATUS THAT DOES NOT RESTRICT LIGHT EMISSION OPERATION MORE THAN NECESSARY WHILE SUPPRESSING TEMPERATURE RISE OF BATTERY, CONTROL METHOD FOR LIGHTING APPARATUS, AND STORAGE MEDIUM

(71) Applicant: CANON KABUSHIKI KAISHA, Tokyo (JP)

(72) Inventor: Keita Hirayama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 24 days.

(21) Appl. No.: 18/999,027

(22) Filed: Dec. 23, 2024

(65) Prior Publication Data

US 2025/0247932 A1 Jul. 31, 2025

(30) Foreign Application Priority Data

Jan. 29, 2024 (JP) ................................ 2024-010795

(51) Int. Cl.

| | |
|---|---|
| ***H05B 41/30*** | (2006.01) |
| ***H05B 41/38*** | (2006.01) |
| ***H05B 47/14*** | (2020.01) |

(52) U.S. Cl.

CPC .................................. *H05B 47/14* (2020.01)

(58) Field of Classification Search

CPC .................................................. H05B 47/14

See application file for complete search history.

(56) References Cited

U.S. PATENT DOCUMENTS

2019/0223277 A1* 7/2019 Saito ..................... H05B 41/30

FOREIGN PATENT DOCUMENTS

| | | |
|---|---|---|
| JP | 2017062275 A | 3/2017 |
| JP | 2021060558 A | 4/2021 |

* cited by examiner

*Primary Examiner* — Henry Luong

(74) *Attorney, Agent, or Firm* — Cowan, Liebowitz & Latman, P.C.

(57) ABSTRACT

A lighting apparatus includes a light source, a capacitor that stores energy, which causes the light source to emit light, at least one processor, and a memory coupled to the processor storing instructions that, when executed by the processor, cause the processor to function as a charging unit that charges the capacitor with a battery, a detecting unit that detects a voltage of the capacitor, and a control unit that controls a light emission operation of the light source based on a change amount of the voltage of the capacitor.

9 Claims, 10 Drawing Sheets

LIGHTING APPARATUS THAT DOES NOT RESTRICT LIGHT EMISSION OPERATION MORE THAN NECESSARY WHILE SUPPRESSING TEMPERATURE RISE OF BATTERY, CONTROL METHOD FOR LIGHTING APPARATUS, AND STORAGE MEDIUM

BACKGROUND

Technical Field

The aspect of the embodiments relates to a lighting apparatus, a control method for the lighting apparatus, and a storage medium.

Description of the Related Art

In a lighting apparatus (a so-called strobe device), which is one of accessories for a digital camera or the like, a discharge tube serving as a light source generates heat due to a light emission operation, and elements of an electric circuit, and a battery also generate heat due to discharging at the time of light emission and charging for light emission preparation. Regarding heat generation from the discharge tube, a control means is provided for appropriately controlling a temperature rise of an optical panel disposed in front of the discharge tube so that the optical panel is within a temperature range in which the optical panel is capable of being used safely (for example, see Japanese Laid-Open Patent Publication (kokai) No. 2021-60558). In addition, a control means is provided for controlling the operation of the electric circuit so that the various electronic and electric components constituting the electric circuit are within a temperature range in which the various electronic and electric components constituting the electric circuit are capable of being used safely (for example, see Japanese Laid-Open Patent Publication (kokai) No. 2017-62275).

Generally, in a lighting apparatus that emits a flash of light, such as a strobe device, a certain amount of energy (electric charge) is stored in a capacitor and the stored energy is then supplied all at once to a discharge tube to generate a flash of light, so charging the capacitor with a battery is performed. A nickel metal hydride battery or an alkaline battery is generally used in a strobe device. However, since the battery has an internal resistance, the battery generates heat when the capacitor is charged by the battery, causing the temperature of the battery to rise. As a means of suppressing a rise in the internal temperature of the strobe device, it is desirable to suppress a rise in the battery temperature, but Japanese Laid-Open Patent Publication (kokai) No. 2021-60558 and Japanese Laid-Open Patent Publication (kokai) No. 2017-62275 do not discuss the temperature rise of the battery. On the other hand, if the execution of the charging operation is excessively suppressed in order to suppress the temperature rise of the battery, a problem will occur in that light is not capable of being emitted at a desired photographing timing.

SUMMARY

A first aspect of the embodiments provides a lighting apparatus comprising a light source, a capacitor that stores energy, which causes the light source to emit light, at least one processor, and a memory coupled to the processor storing instructions that, when executed by the processor, cause the processor to function as a charging unit that charges the capacitor with a battery, a detecting unit that detects a voltage of the capacitor, and a control unit that controls a light emission operation of the light source based on a change amount of the voltage of the capacitor.

Further features of the disclosure will become apparent from the following description of exemplary embodiments with reference to the attached drawings.

DESCRIPTION OF THE EMBODIMENTS

Figure 1:
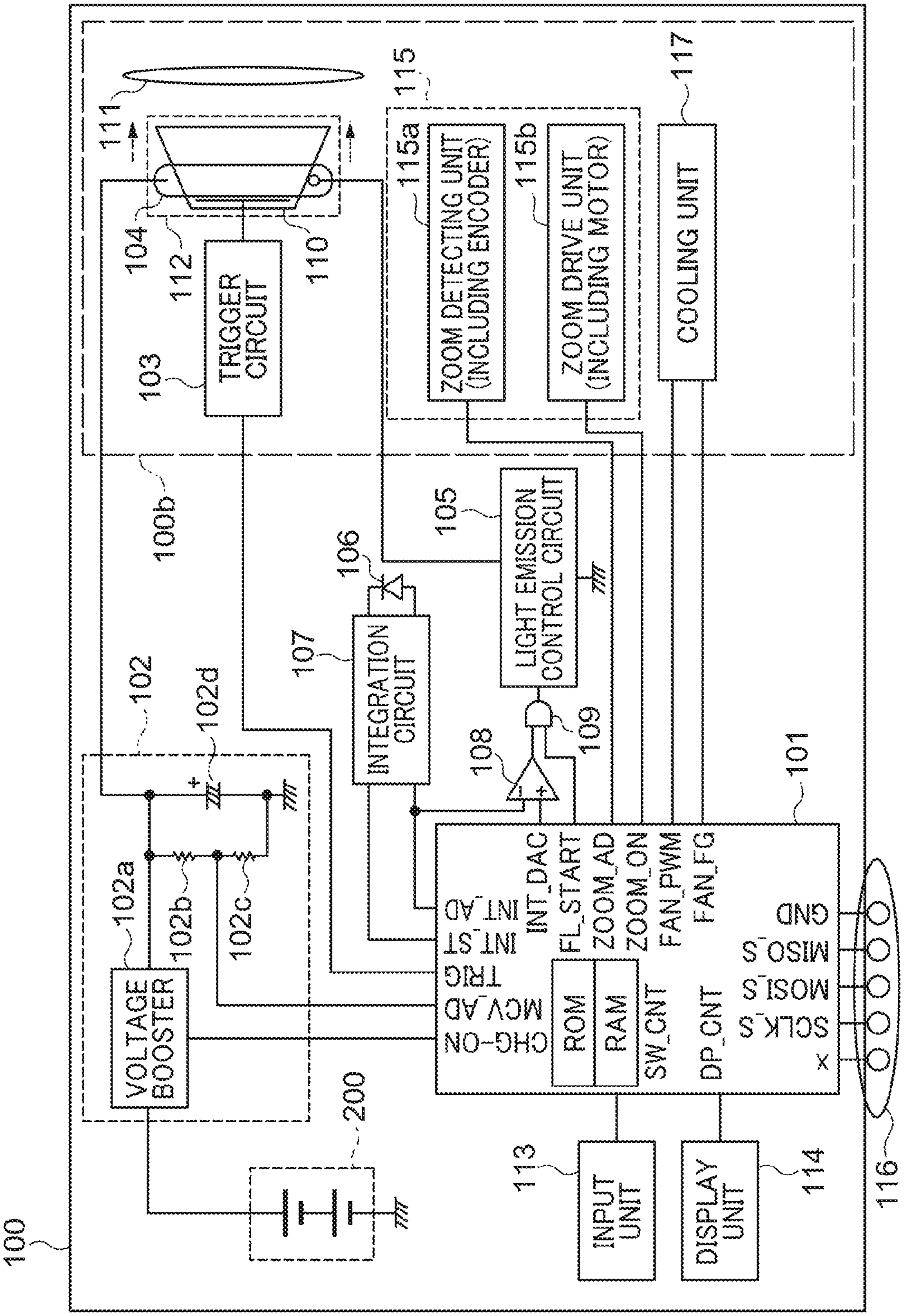
FIG. 1 is a block diagram that shows a schematic configuration of a strobe device according to an embodiment.

Hereinafter, embodiments will be described in detail with reference to the attached drawings. Note, the following embodiments are not intended to limit the scope of the claimed disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

Hereinafter, an embodiment of the disclosure will be described in detail with reference to the attached drawings. Here, as a lighting apparatus according to the present embodiment, a strobe device capable of being attached or detached as an accessory to or from an image pickup apparatus such as a digital camera will be taken up.

Figure 2:
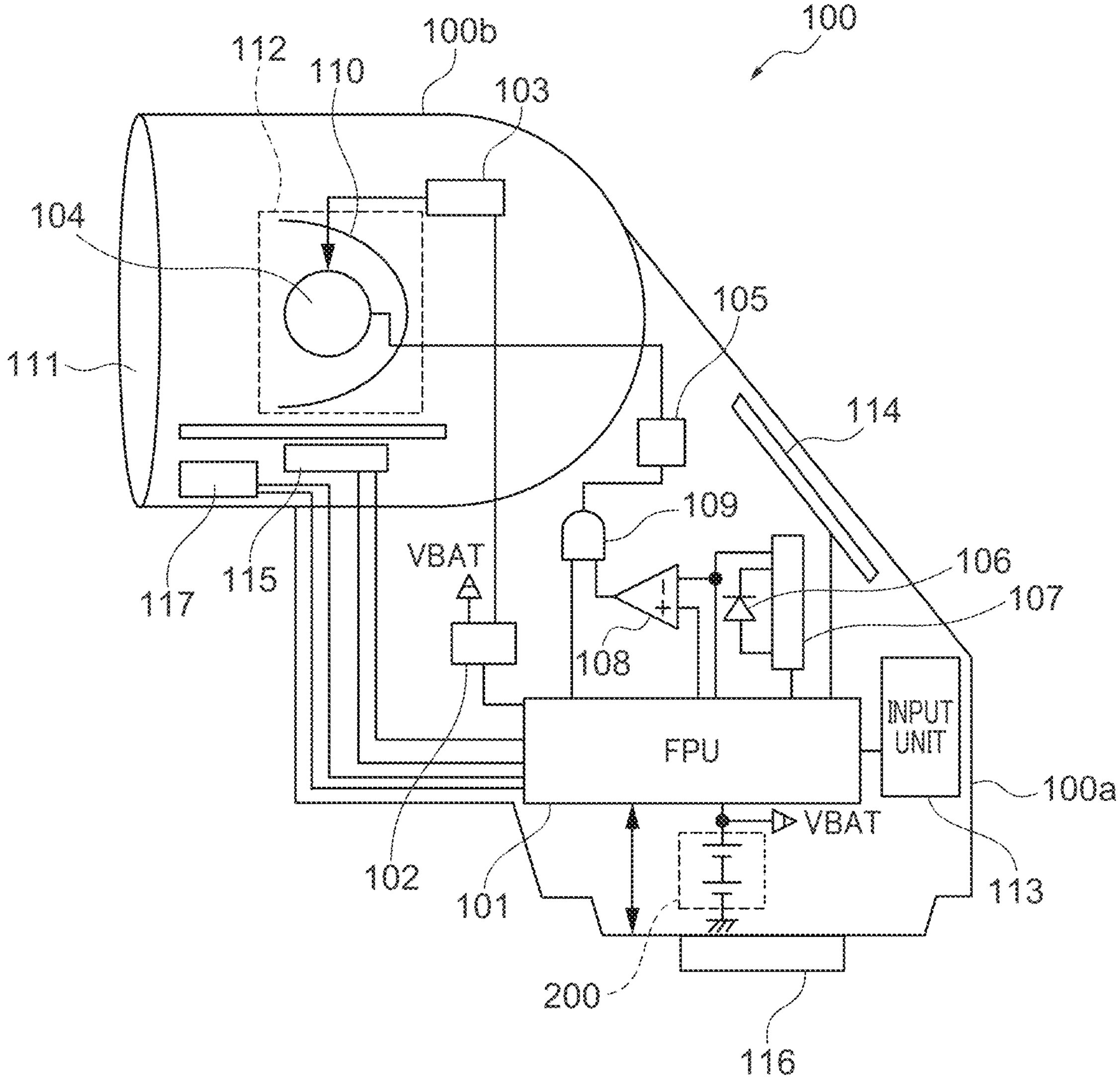
FIG. 2 is a sectional view that shows the schematic configuration of the strobe device shown in FIG. 1.

FIG. 1 is a block diagram that shows a schematic configuration of a strobe device 100 according to the present embodiment. FIG. 2 is a sectional view that shows the schematic configuration of the strobe device 100. It should be noted that the same reference numerals in FIG. 1 and FIG. 2 indicate the same components.

The strobe device 100 includes a main body portion 100*a* that is configured as an attaching/detaching portion with respect to an image pickup apparatus (not shown), and a light emitting unit 100*b* that is rotatable in an up-down direction (a vertical direction) and a left-right direction (a lateral direction) relative to the main body portion 100*a*. It should be noted that the up-down direction and the left-right direction refer to an up-down direction and a left-right direction when the image pickup apparatus, to which the strobe device 100 has been attached, is held in a normal position and is viewed from the front.

The strobe device 100 includes an FPU 101, a battery 200, a voltage boost circuit block 102, a trigger circuit 103, a light emission control circuit 105, a discharge tube 104, a photodiode 106, an integration circuit 107, a comparator 108, and an AND gate 109. In addition, the strobe device 100 includes a reflector 110, an optical panel 111, an input unit 113, a display unit 114, a zoom driving circuit 115, camera connection terminals 116, and a cooling unit 117. The discharge tube 104 and the reflector 110 constitute a reflector unit 112.

The FPU 101 is a microcomputer that comprehensively controls the respective units (the respective components) of the strobe device 100. The FPU 101 is configured as a one-chip integrated circuit (a one-chip IC) with a built-in microcomputer including a central processing unit (a CPU), a read only memory (a ROM), a random access memory (a RAM), an input/output control circuit (an I/O control circuit), a multiplexer, a timer circuit, an electrically erasable programmable read-only memory (an EEPROM), an A/D converter, a D/A converter, etc. The battery 200 is used as a power source (VBAT) for the strobe device 100. The voltage boost circuit block 102 includes a voltage booster 102*a*, resistors 102*b* and 102*c* that are used for voltage detection, and a main capacitor 102*d*. The voltage boost circuit block 102 boosts the voltage of the battery 200 to several hundred volts by the voltage booster 102*a*, and stores energy (electric charge) for light emission in the main capacitor 102*d*. It should be noted that a voltage (a charging voltage) of the main capacitor 102*d* is divided by the resistors 102*b* and 102*c*, and the divided voltage is inputted into an A/D conversion terminal MCV_AD of the FPU 101.

The trigger circuit 103 applies a pulse voltage, which excites the discharge tube 104, to the discharge tube 104. The light emission control circuit 105 controls the start and the stop of light emission of the discharge tube 104. The discharge tube 104 (a light source) is excited by receiving the pulse voltage of several kilovolts applied from the trigger circuit 103, and emits a flash of light by using the energy stored in the main capacitor 102*d*.

The photodiode 106 is a sensor that receives the light emitted from the discharge tube 104, and receives the light emitted by the discharge tube 104 directly or via a glass fiber or the like. The integration circuit 107 integrates a light-receiving current of the photodiode 106, and inputs the output to an inverting input terminal of the comparator 108 and an A/D converter terminal INT_AD of the FPU 101. A non-inverting input terminal of the comparator 108 is connected to a D/A converter terminal INT_DAC within the FPU 101, and the output of the comparator 108 is connected to one input terminal of the AND gate 109. The other input terminal of the AND gate 109 is connected to a light emission control terminal FL_START of the FPU 101, and the output of the AND gate 109 is inputted into the light emission control circuit 105.

The light emitting unit 100*b* mainly includes the discharge tube 104, the reflector 110, and the optical panel 111, and the direction of irradiation of the light emitted by the discharge tube 104 is changed by rotation relative to the main body portion 100*a*. The reflector 110 reflects the light emitted by the discharge tube 104 and guides it in a predetermined direction. The optical panel 111 is included in a zoom optical system (not shown) and is incorporated so that a relative position to the reflector unit 112 (a zoom position) is capable of being changed. By changing the relative position between the reflector unit 112 and the optical panel 111, an irradiation angle of the strobe device 100 is capable of being changed, and a guide number is capable of being changed.

The input unit 113 includes a power switch, a mode setting switch for setting the operation mode of the strobe device 100 including the drive setting of the cooling unit 117 in response to a user operation, a setting button for setting various other parameters in response to a user operation, etc. The FPU 101 receives signals from the input unit 113 and executes various kinds of processing. The display unit 114 includes a liquid crystal panel and light emitting elements, and displays various states of the strobe device 100.

The zoom driving circuit 115 includes a zoom detecting unit 115*a* that detects information about the relative position between the reflector unit 112 and the optical panel 111 by using an encoder or the like, and a zoom drive unit 115*b* that includes a motor that moves the reflector unit 112. The FPU 101 calculates the amount of movement of the reflector unit 112 by the zoom drive unit 115*b* by using focal length information of a photographing lens that is capable of being obtained via the image pickup apparatus.

The camera connection terminals 116 include a plurality of terminals that are connected to the image pickup apparatus. Specifically, the camera connection terminals 116 include an SCLK_S terminal for synchronizing communication between the image pickup apparatus and the strobe device 100, and a GND terminal for electrically connecting the image pickup apparatus and the strobe device 100. In addition, the camera connection terminals 116 include a MOSI_S terminal for receiving data transmitted from (a control unit of) the image pickup apparatus, and a MISO_S terminal for transmitting data from the strobe device 100 to (the control unit of) the image pickup apparatus.

The cooling unit 117 is a module that includes a fan for cooling the optical panel 111, and is connected to an FAN_PWM terminal and an FAN_FG terminal of the FPU 101. The cooling unit 117 is capable of changing the output air volume by changing a rotation speed of the fan through PWM control from the FPU 101. In addition, the cooling unit 117 is capable of maintaining the instructed rotation speed by feeding back rotation speed information to the FPU 101.

Figure 3:
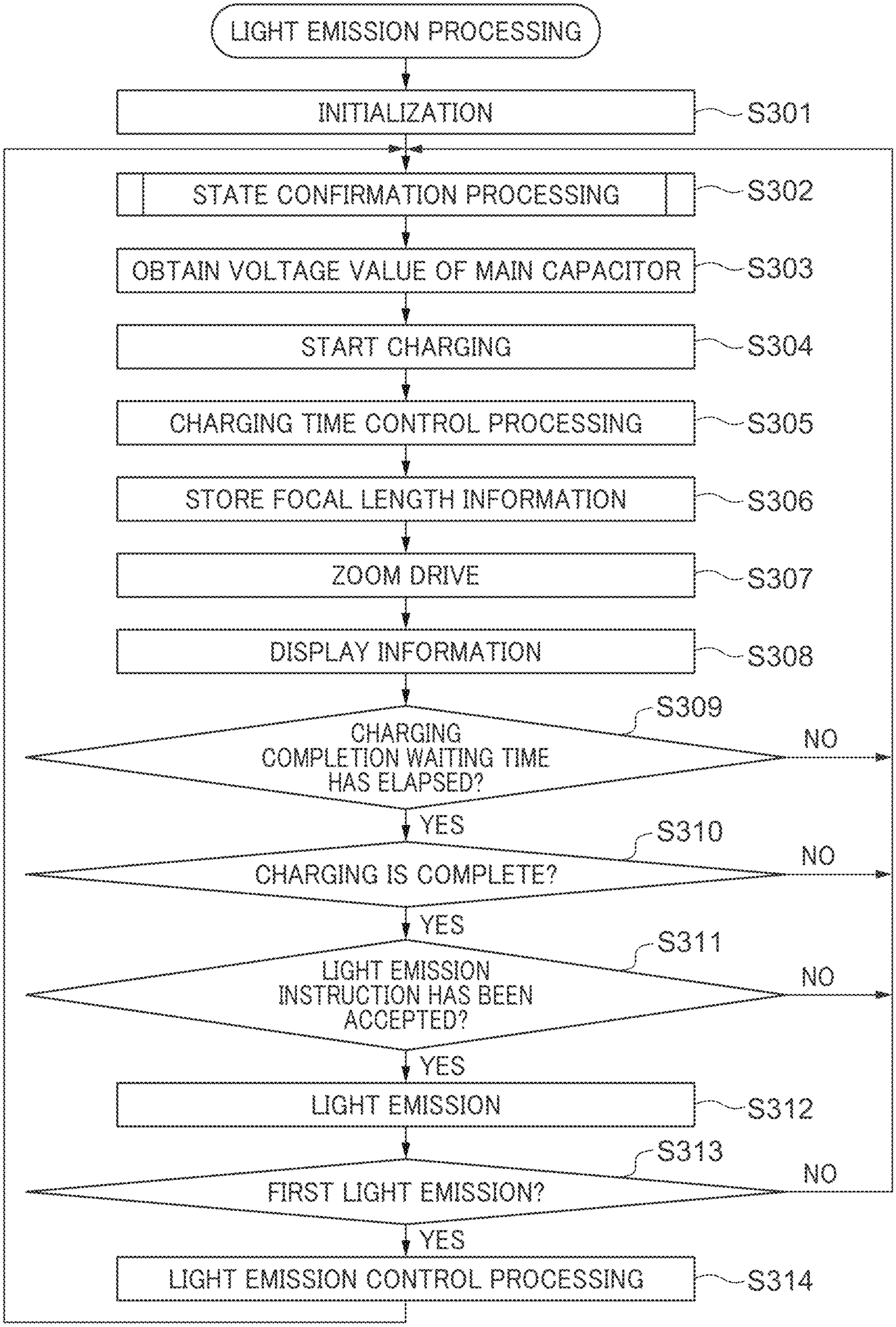
FIG. 3 is a flowchart of a light emission processing executed in the strobe device shown in FIG. 1.

Next, a light emission processing executed by the strobe device 100 will be described. FIG. 3 is a flowchart that illustrates the light emission processing executed by the strobe device 100. Respective processes (respective steps) indicated by S numbers in FIG. 3 are realized by the CPU of the FPU 101 loading a predetermined program, which has been stored in its own ROM, into its own RAM and comprehensively controlling the operations of the respective units of the strobe device 100. When the power switch included in the input unit 113 is operated to be turned on and the FPU 101 of the strobe device 100 becomes operable (enabled), the FPU 101 starts the process of S301. It should be noted that although not shown in FIG. 3, the light emission processing ends when the power switch has been operated to be turned off.

In S301, the FPU 101 initializes its own memory and its own ports, reads the states of the switches included in the input unit 113 and pre-set input information, and performs setting of a determining method of a light emission amount in the light emission mode that has been set, a light emission timing, etc.

In S302, the FPU 101 performs a state confirmation processing. The state confirmation processing is a processing that stores the state results, which have been confirmed in S301, in its own RAM, and will be described in detail below.

In S303, the FPU 101 reads a voltage value of the main capacitor 102*d* from the MCV_AD terminal, which is the A/D conversion terminal, and stores the voltage value of the main capacitor 102*d* in its own RAM.

In S304, the FPU 101 causes the voltage boost circuit block 102 to start operating, thereby starting charging of the main capacitor 102*d*. It should be noted that after the charging starts, the process of S304 after the processing is returned to S302 again is skipped.

In S305, the FPU 101 performs a charging time control processing. The charging time control processing is generally a processing that controls the time for executing determination of charging completion in S310 with respect to the charging operation started in S304 after light emission (S312) has been performed. It should be noted that the charging time control processing will be described in detail below.

In S306, the FPU 101 obtains the focal length information of the photographing lens from (the control unit of) the image pickup apparatus via the camera connection terminal 116, and stores the obtained focal length information in its own RAM. It should be noted that in the case that the focal length information has already been stored in the RAM, the stored focal length information is updated with the focal length information that has been newly obtained in S306.

In S307, the FPU 101 drives the zoom driving circuit 115 to move the reflector unit 112 so that a light distribution angle of the light emitted by the discharge tube 104 falls within a range according to the focal length information that has been obtained in S306. It should be noted that in the case that there is no need to move the reflector unit 112, the process of S307 is skipped.

In S308, the FPU 101 displays, on the display unit 114, the information about the light emission mode that has been confirmed in S301 and the information about the focal length information that has been obtained in S306. In addition, in the case that the FPU 101 has detected in S302 that an error has occurred in any of the hardware related to the light emission processing, the FPU 101 issues a warning in accordance with the content of the detected error (for example, performs a warning display on the display unit 114).

In S309, the FPU 101 determines whether or not a predetermined charging completion waiting time has elapsed. It should be noted that the charging completion waiting time is set under a predetermined condition in the charging time control processing performed in S305, the details of which will be described below. In the case that the FPU 101 determines that the charging completion waiting time has elapsed (YES in S309), the FPU 101 executes the process of S310, and on the other hand, in the case that the FPU 101 determines that the charging completion waiting time has not elapsed (NO in S309), the FPU 101 executes the process of S302.

In S310, the FPU 101 determines whether or not the charging of the main capacitor 102*d* is complete based on the voltage of the MCV_AD terminal. In the present embodiment, a minimum voltage value, at which the FPU 101 determines that the charging of the main capacitor 102*d* is complete, is set to 270V. That is, in the strobe device 100, the discharge tube 104 becomes able to emit light when the voltage of the main capacitor 102*d* is 270V or higher.

In the case that the FPU 101 determines that the charging of the main capacitor 102*d* is complete (YES in S310), the FPU 101 transmits a charging completion signal to (the control unit of) the image pickup apparatus via the camera connection terminal 116, and then executes the process of S311. On the other hand, in the case that the FPU 101 determines that the charging of the main capacitor 102*d* is not complete (NO in S310), the FPU 101 executes the process of S302.

In S311, the FPU 101 determines whether or not a light emission instruction has been accepted based on whether or not a light emission start signal has been received from (the control unit of) the image pickup apparatus. In the case that the FPU 101 determines that a light emission instruction has been accepted (YES in S311), the FPU 101 executes the process of S312, and on the other hand, in the case that the FPU 101 determines that a light emission instruction has not been accepted (NO in S311), the FPU 101 executes the process of S302.

In S312, the FPU 101 performs a light emission process (the light emission). The light emission process is executed by the FPU 101 issuing the light emission instruction to the light emission control circuit 105 in accordance with the light emission start signal received from the image pickup apparatus, and the light emission control circuit 105 causing the discharge tube 104 to emit light in accordance with the light emission instruction. After the light emission is completed, the FPU 101 stores information about the light emission, such as the voltage information of the main capacitor 102*d*, in its own RAM. It should be noted that in the case that main light emission is performed after pre-light emission for light control is performed, the process of S313 is executed after the main light emission is completed.

In S313, the FPU 101 determines whether or not the light emission performed in S312 is the first light emission (whether or not the light emission performed in S312 is the first light emission after the start of S301). In the case that the FPU 101 determines that the light emission performed in S312 is the first light emission (YES in S313), the FPU 101 executes the process of S314. On the other hand, in the case that the FPU 101 determines that the light emission performed in S312 is not the first light emission (the light emission performed in S312 is the second or subsequent light emission) (NO in S313), the FPU 101 executes the process of S302. It should be noted that although this determination will be described below, the FPU 101 calculates an expected temperature or a value that serves as an alternative to the expected temperature (an alternative value) of the portion (the part) that needs to be protected from the heat generated by the strobe device 100, and in the case that the calculated value is equal to or smaller than a predetermined value, it is determined that this is the first light emission.

In S314, the FPU 101 executes a light emission control processing, and then executes the process of S302. The light emission control processing is a processing that controls the light emission and the charging so that excessive heat is not generated abnormally even in the case that heat caused by the light emission is continuously applied to the panel due to continuous light emission or the like. In the light emission control processing, the FPU 101 parameterizes the influence of the heat on the strobe device 100 due to the light emission of the discharge tube 104 by using a heating amount, a heat dissipation amount, a distance to the heat source, and the like. Furthermore, the FPU 101 controls the next light emission timing based on the calculated value of, the expected temperature or the alternative value of the portion that needs to be protected from the heat generated by the strobe device 100.

It should be noted that when the light emission control processing is started in S314, the FPU 101 continues to calculate the expected temperature or the alternative value until the calculated value of, the expected temperature or the alternative value of the portion that needs to be protected from the heat generated by the strobe device 100 becomes equal to or smaller than the predetermined value. In other words, after S314, the FPU 101 continues to calculate the expected temperature or the alternative value concurrent with the process of S302 and the succeeding processes.

In addition, after the light emission control processing has been performed in S314, in the case that the calculated value obtained by parallel calculation is equal to or greater than the predetermined value, in S310, the FPU 101 determines that this is the second or subsequent light emission, and since there is no need to execute the light emission control processing again, the FPU 101 executes the process of S302 without proceeding to S314.

Figure 4:
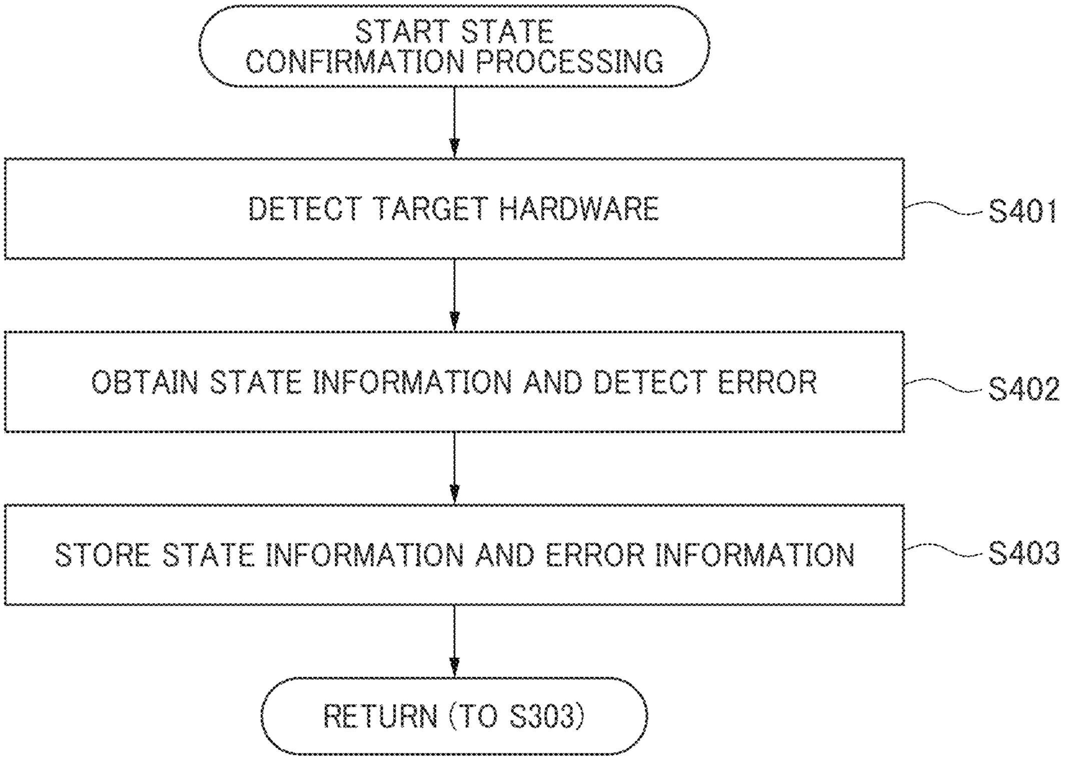
FIG. 4 is a flowchart of a state confirmation processing executed in S302.

FIG. 4 is a flowchart that illustrates the state confirmation processing executed in S302.

In S401, the FPU 101 performs a processing of detecting the target hardware. The target hardware has been registered in advance in the ROM of the FPU 101, and the FPU 101 detects whether or not the registered target hardware has been provided. The target hardware refers to components (members) that have influences as the optical system or the heat source, such as the cooling unit 117 that cools the optical panel 111, and optical accessories (not shown in FIG. 2) such as a color filter and a bounce adapter that have been attached in front of the optical panel 111. It should be noted that the target hardware may include an external power source (not shown) for speeding up the charging of the main capacitor 102*d*, a modeling LED (not shown) for making it easier to understand an optical axis of the light emitted from the optical panel 111, etc.

In S402, the FPU 101 obtains state information of the target hardware that has been detected in S401, and performs an error detection processing of the target hardware based on the obtained state information. The state information includes, for example, specifications of the target hardware and information on whether the target hardware is operational or not. In addition, for example, even though the cooling unit 117 is set to be operable in the setting of the light emission mode that has been performed in S301, there is a case that the cooling unit 117, which is the target hardware, is inoperable due to a malfunction or the like. In this case, the fact that the cooling unit 117 is inoperable is detected as error information. The state information and the error information are updated whenever a change occurs in the state of the target hardware.

In S403, the FPU 101 stores the state information and the error information of the target hardware that have been obtained in S402 in its own RAM, and then ends the state confirmation processing and executes the process of S303.

Figure 5:
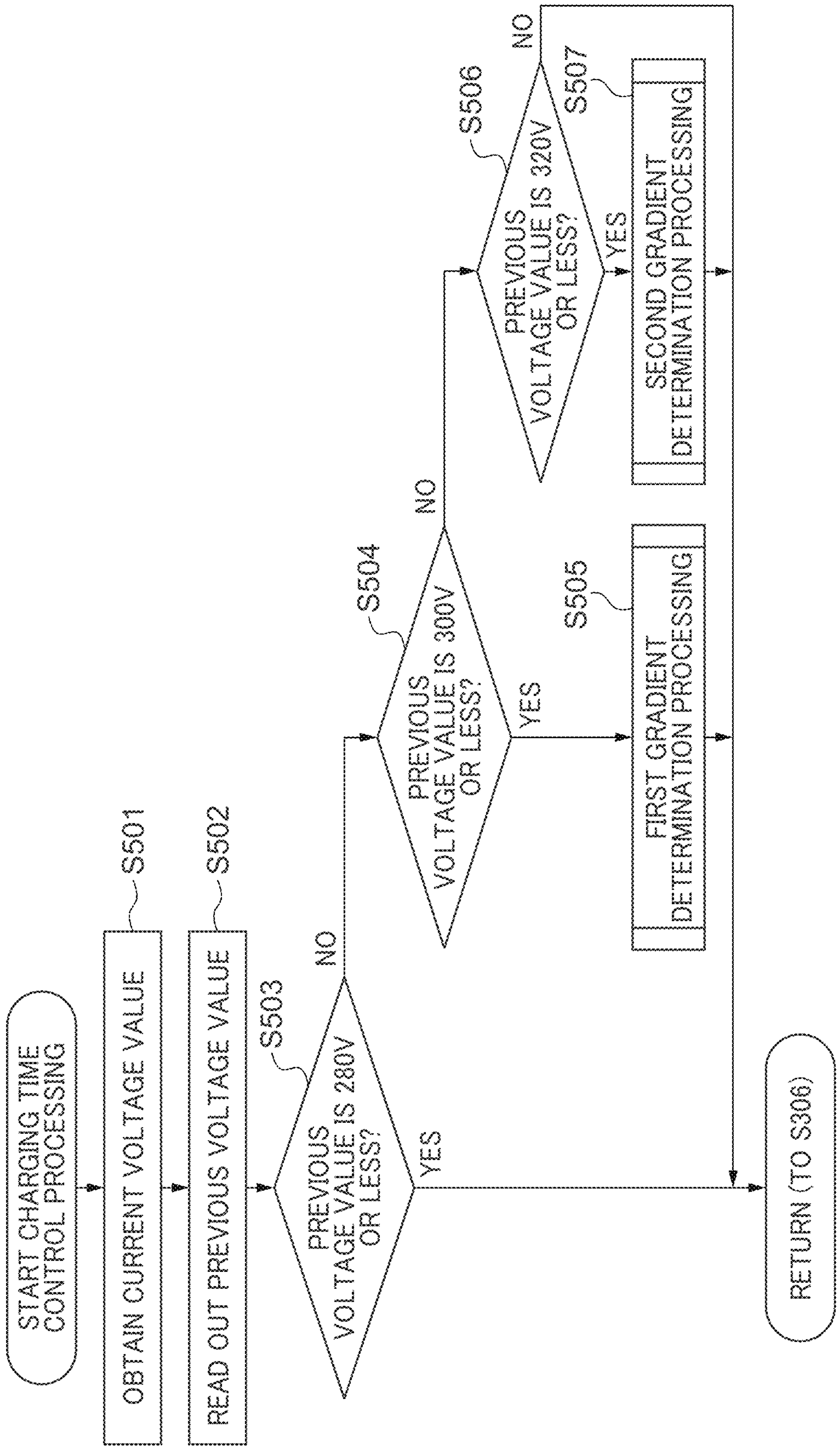
FIG. 5 is a flowchart of a charging time control processing executed in S305.

FIG. 5 is a flowchart that illustrates the charging time control processing executed in S305. For ease of description, it is assumed here that a maximum voltage value of the main capacitor 102*d* is 330V.

In S501, the FPU 101 obtains the current voltage of the main capacitor 102*d* as a current voltage value and stores the current voltage value in its own RAM.

In S502, the FPU 101 reads out, as a previous voltage value, the voltage value of the main capacitor 102*d* that has been obtained in S303 and has been stored in the RAM.

In S503, the FPU 101 determines whether or not the previous voltage value that has been read out in S502 is equal to or lower than 280V. In the case that the FPU 101 determines that the previous voltage value is equal to or lower than 280V (YES in S503), the FPU 101 ends the charging time control processing and then executes the process of S306. On the other hand, in the case that the FPU 101 determines that the previous voltage value is higher than 280V (NO in S503), the FPU 101 executes the process of S504.

In S504, the FPU 101 determines whether or not the previous voltage value that has been read out in S502 is equal to or lower than 300V. In the case that the FPU 101 determines that the previous voltage value is equal to or lower than 300V (YES in S504), the FPU 101 executes the process of S505. On the other hand, in the case that the FPU 101 determines that the previous voltage value is higher than 300V (NO in S504), the FPU 101 executes the process of S506.

In S505, the FPU 101 executes a first gradient determination processing, and then ends the charging time control processing and executes the process of S306. The first gradient determination processing will be described in detail below with reference to FIG. 6A.

In S506, the FPU 101 determines whether or not the previous voltage value that has been read out in S502 is equal to or lower than 320V. In the case that the FPU 101 determines that the previous voltage value is equal to or lower than 320V (YES in S506), the FPU 101 executes the process of S507. On the other hand, in the case that the FPU 101 determines that the previous voltage value is higher than 320V (NO in S506), the FPU 101 ends the charging time control processing and then executes the process of S306.

In S507, the FPU 101 executes a second gradient determination processing, and then ends the charging time control processing and executes the process of S306. The second gradient determination processing will be described in detail below with reference to FIG. 6B.

Figure 6A:
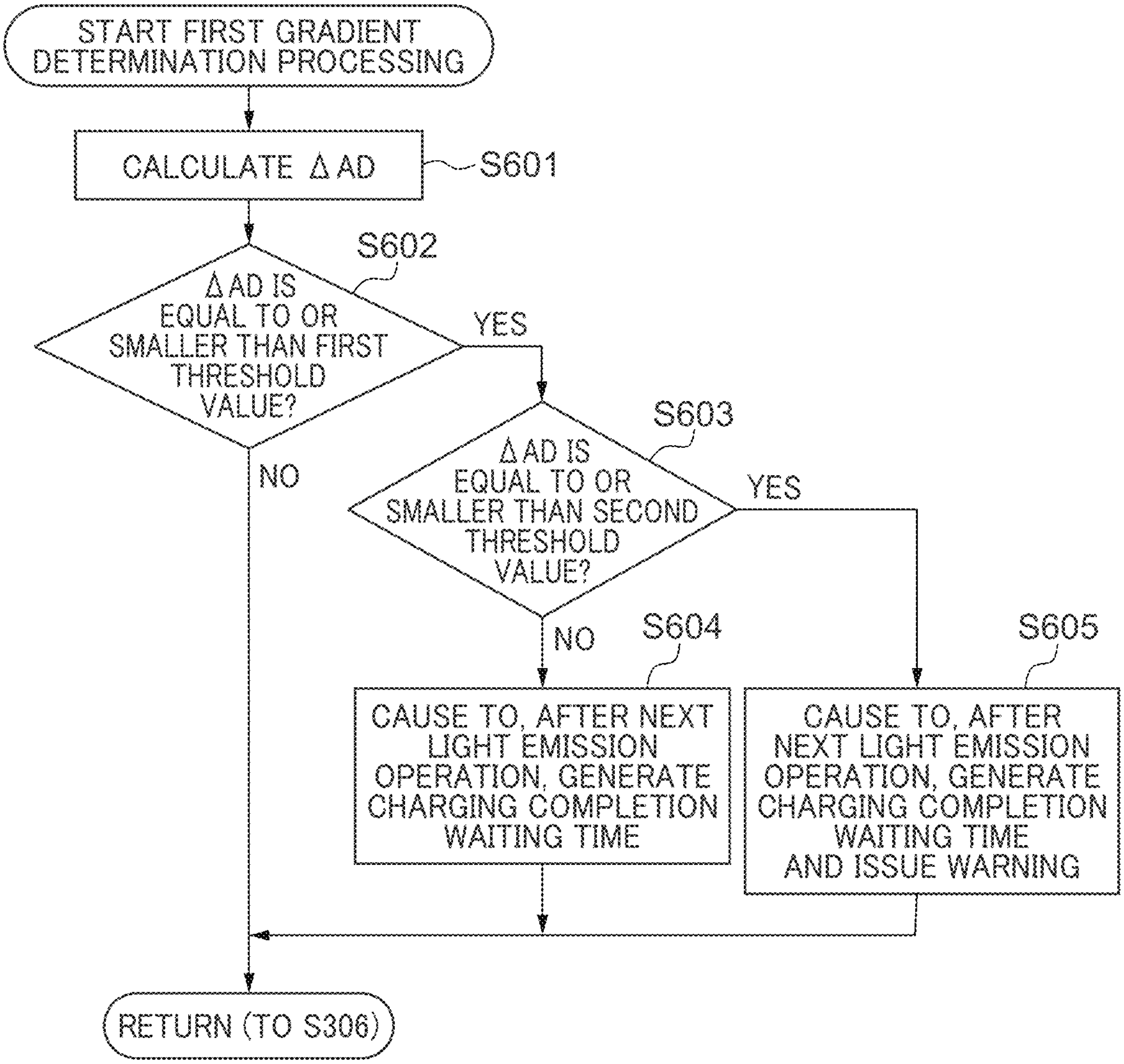
FIG. 6A is a flowchart of a first gradient determination processing executed in S505.

FIG. 6A is a flowchart of the first gradient determination processing executed in S505.

In S601, the FPU 101 reads out the current voltage value that has been stored in the RAM in S501, and calculates a change amount of the charging voltage of the main capacitor 102*d* (hereinafter, referred to as "a voltage gradient ΔAD") based on the current voltage value that has been read out and the previous voltage value that has been read out in S502.

Here, a method for calculating the voltage gradient ΔAD will be described. The voltage gradient ΔAD is expressed by the following Expression 1. Here, "ADpre" represents the previous voltage value that has been read out in S502, "ADcur" represents the current voltage value that has been obtained in S501, and "N" represents an elapsed time from obtainment of the previous voltage value to obtainment of the current voltage value.

$$\Delta AD = \frac{AD_{cur} - AD_{pre}}{N} \quad \text{[Expression 1]}$$

In S602, the FPU 101 determines whether or not the voltage gradient ΔAD is equal to or smaller than a predetermined first threshold value. The first threshold value will be described in detail below, but generally, the first threshold value is used to determine whether or not a temperature rise of the battery 200 caused by the charging of the main capacitor 102*d* with the battery 200 is small. In the case that the FPU 101 determines that the voltage gradient ΔAD is greater than the first threshold value (NO in S602), the FPU 101 ends the first gradient determination processing and then executes the process of S306. On the other hand, in the case that the FPU 101 determines that the voltage gradient ΔAD is equal to or smaller than the first threshold value (YES in S602), the FPU 101 executes the process of S603.

In S603, the FPU 101 determines whether or not the voltage gradient ΔAD is equal to or smaller than a predetermined second threshold value. The second threshold value is a value smaller than the first threshold value. The second threshold value will be described in detail below, but generally, the second threshold value is used to determine whether or not the temperature rise of the battery 200 caused by the charging of the main capacitor 102*d* with the battery 200 is large. In the case that the FPU 101 determines that the voltage gradient ΔAD is greater than the second threshold value (NO in S603), the FPU 101 executes the process of S604. On the other hand, in the case that the FPU 101 determines that the voltage gradient ΔAD is equal to or smaller than the second threshold value (YES in S603), the FPU 101 executes the process of S605.

In S604, the FPU 101 stores a setting for a charging completion waiting time in its own RAM so as to cause to, after the next light emission operation, generate the charging completion waiting time, ends the first gradient determination processing, and executes the process of S306. The charging completion waiting time is an elapsed time required after the next light emission operation (S312) has been performed until it is determined again whether or not the charging is complete (S310). In other words, the charging completion waiting time is a time to delay the execution of the determination of S310 for a certain period of time. In the case that the charging completion waiting time has been set, the measurement of the charging completion waiting time is started simultaneously with the end of the next light emission operation (S312), and the elapse of the charging completion waiting time is measured in S309 after the processing is returned to S302. Regardless of the voltage value of the main capacitor 102*d* that has been obtained in S303, the determination of charging completion in S310 is not performed unless the charging completion waiting time has elapsed.

In S605, the FPU 101 stores a setting for a charging completion waiting time in its own RAM so as to cause to, after the next light emission operation, generate the charging completion waiting time, and concurrently displays a warning on the display unit 114, and then ends the first gradient determination processing, and executes the process of S306. The charging completion waiting time generated in S605 may be the same as the charging completion waiting time generated in S604, or may be longer than the charging completion waiting time generated in S604.

It should be noted that although the details will be described below, the charging completion waiting time generated in S604 and the charging completion waiting time generated in S605 are set (provided) to suppress the temperature rise of the battery 200 due to discharging of the battery 200 when the charging of the main capacitor 102*d* with the battery 200 is performed. In the first gradient determination processing, the voltage gradient ΔAD when the voltage of the main capacitor 102*d* is in the range of 280V to 300V is compared with the first threshold value or the second threshold value, and the temperature rise of the battery 200 is determined to be in one of three stages: "large", "medium", and "small". In the case of being determined that the voltage gradient ΔAD is greater than the first threshold value, the temperature rise of the battery 200 is determined to be small, and in the case of being determined that the voltage gradient ΔAD is equal to or smaller than the first threshold value and is greater than the second threshold value, the temperature rise of the battery 200 is determined to be medium. In the case of being determined that the voltage gradient ΔAD is equal to or smaller than the second threshold value, the temperature rise of the battery 200 is determined to be large.

In addition, examples of the warning issued in S605 include a warning display on the liquid crystal panel of the display unit 114, blinking or lighting of the light emitting element, and the like. The contents of the warning display include, for example, notifying the user of a low battery level or the temperature rise of the battery 200. In the case of still image photographing, the warning may be issued by emitting a voice (for example, a warning sound).

Figure 6B:
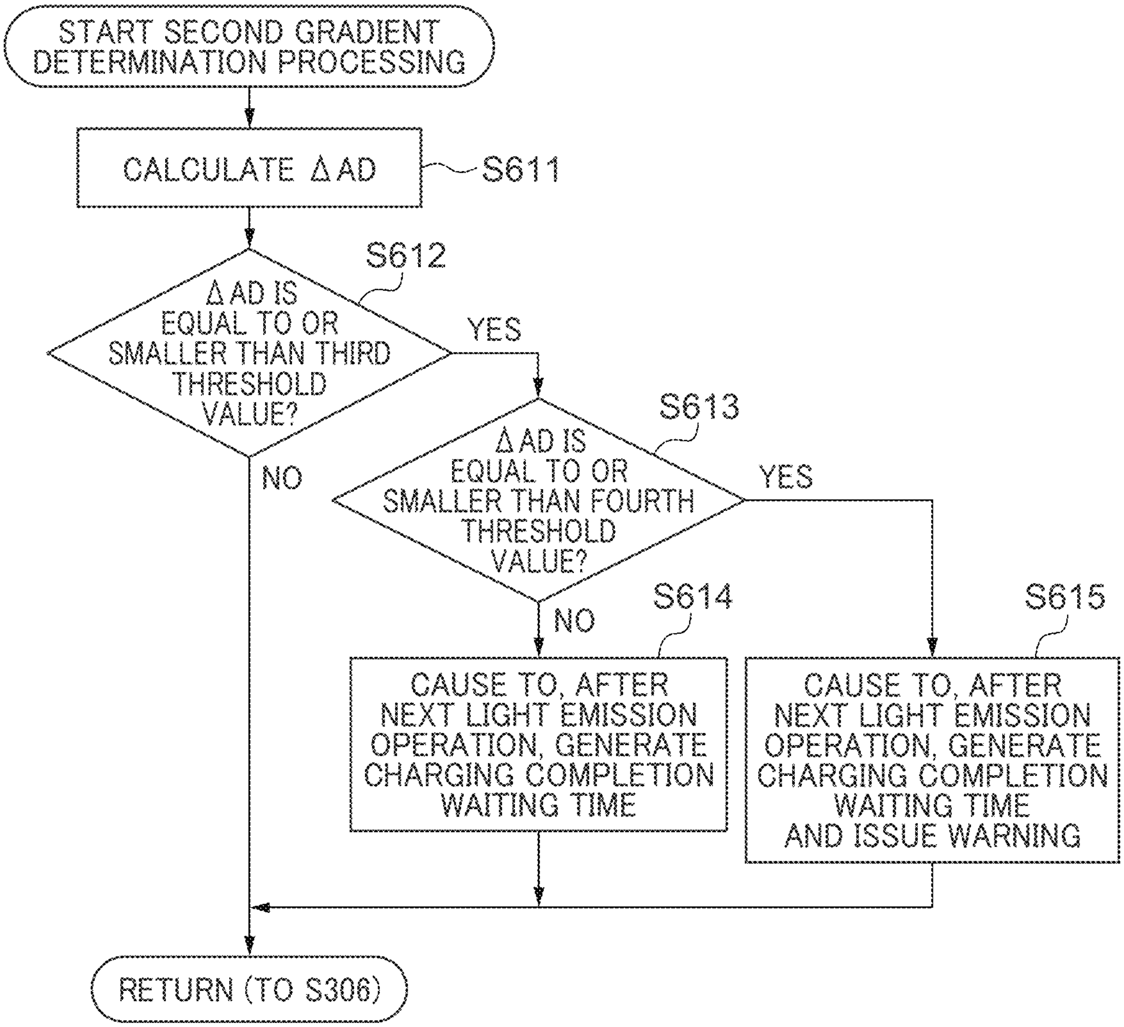
FIG. 6B is a flowchart of a second gradient determination processing executed in S507.

FIG. 6B is a flowchart of the second gradient determination processing executed in S507. In the flowchart of FIG. 6B, "the first threshold value" in S602 of the flowchart of FIG. 6A is replaced with "a third threshold value" in S612, and "the second threshold value" in S603 of the flowchart of FIG. 6A is replaced with "a fourth threshold value" in S613. The third threshold value plays a role corresponding to the first threshold value, and the fourth threshold value plays a role corresponding to the second threshold value. The contents of processes of S611 to S615 are similar to the contents of the processes of S601 to S605 in the flowchart of FIG. 6A, respectively, and therefore the descriptions thereof will be omitted. It should be noted that a charging completion waiting time generated in S614 and a charging completion waiting time generated in S615 may be the same as the charging completion waiting time generated in S604 and the charging completion waiting time generated in S605, respectively. The content of a warning issued in S615 is the same as the content of the warning issued in S605.

As described for S604 and S605, the first gradient determination processing and the second gradient determination processing are controls that delay the next light emission operation by generating the charging completion waiting time and delaying the execution of the determination of charging completion, and do not perform control to stop the operation of starting charging of S304. In this way, by performing the first gradient determination processing or the second gradient determination processing during the charging operation after the voltage of the main capacitor 102*d* has dropped due to the light emission operation, the first gradient determination processing and the second gradient determination processing are capable of being executed without depending on the light emission amount of the light emission operation and a light emission interval of the light emission operation.

In the present embodiment, as described above, the threshold values used in the gradient determination processing are changed depending on the previous voltage value. Before describing the reason for this, a charging characteristic of the main capacitor 102*d* according to the type of the battery will be described.

Figure 7:
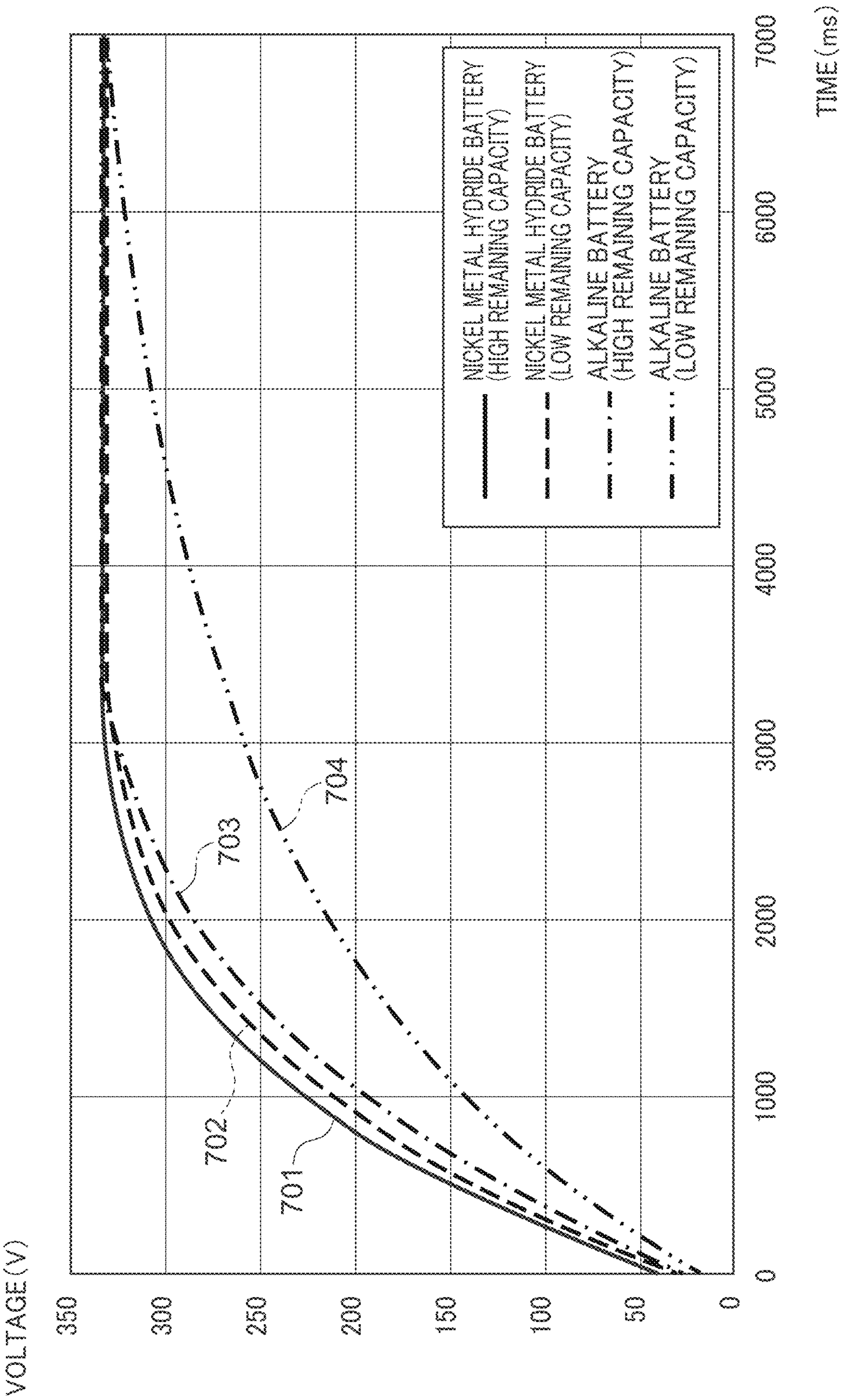
FIG. 7 is a graph that shows a charging characteristic of a main capacitor for each type of battery.

FIG. 7 is a graph that shows the relationship between a charging time and a voltage in the case that the main capacitor 102*d* has been charged by using a nickel metal hydride battery and an alkaline battery as the battery 200, based on actual measurement values.

A solid line graph 701 represents the charging characteristic in the case of using a nickel metal hydride battery in a state where the remaining battery power is sufficient, and it can be seen that the time required for the main capacitor 102*d* to reach its maximum voltage value of 330V is shorter than that of any other battery. A broken line graph 702 represents the charging characteristic in the case of using a nickel metal hydride battery in a state where the remaining battery power has dropped, and it can be seen that the charging time is slightly longer than that of the solid line graph 701.

A one-dot chain line graph 703 represents the charging characteristic in the case of using an alkaline battery in a state where the remaining battery power is sufficient, and it can be seen that the charging time is slightly longer than that of the solid line graph 701. A two-dot chain line graph 704 represents the charging characteristic in the case of using an alkaline battery in a state where the remaining battery power has dropped, and it can be seen that the charging time required to reach the maximum voltage value of 330V is significantly longer than that of the other graphs 701 to 703.

In general, an alkaline battery has a higher internal resistance than a nickel metal hydride battery. Therefore, when performing charging with respect to the main capacitor 102*d*, the temperature of the alkaline battery is more likely to rise than that of the nickel metal hydride battery. In addition, in the case of using an alkaline battery with a low remaining battery power (a low remaining capacity), the charging time for the main capacitor 102*d* becomes long, and heat continues to be generated while charging is being performed. For example, in the case of using an alkaline battery with a low remaining battery power, the voltage of the main capacitor 102*d* reaches 320V about seven seconds after the start of charging, but heat continues to be generated during this period of time. On the other hand, in the case of using a nickel metal hydride battery (regardless of the remaining battery power), the voltage of the main capacitor 102*d* reaches 320V about four seconds after the start of charging, so compared to an alkaline battery with a low remaining battery power, the next three seconds is capable of being devoted to cooling the battery. In other words, in the case of using an alkaline battery with a low remaining battery power, it can be seen that a state, in which the temperature of the battery is likely to rise due to charging, continues for a long time. The same can be said about the time required for the voltage of the main capacitor 102*d* to reach 270V, at which light is capable of being emitted, and if charging up to 270V is performed continuously by using an alkaline battery with a low remaining battery power, there is a risk that the battery temperature will rise.

Therefore, in the case of using a new alkaline battery as the battery 200, the battery does not generate much heat at the beginning of use, but as the number of times of light emission increases and the remaining battery power decreases, the temperature of the battery is likely to rise due to the charging of the main capacitor 102*d*, so it is necessary to suppress the temperature rise of the battery. The first gradient determination processing and the second gradient determination processing in S305 are executed to suppress the temperature rise of the battery 200 due to the charging of the main capacitor 102*d*. In other words, the first gradient determination processing and the second gradient determination processing in S305 are executed to cool the battery by providing (setting) a time when no charging is performed.

Figure 8:
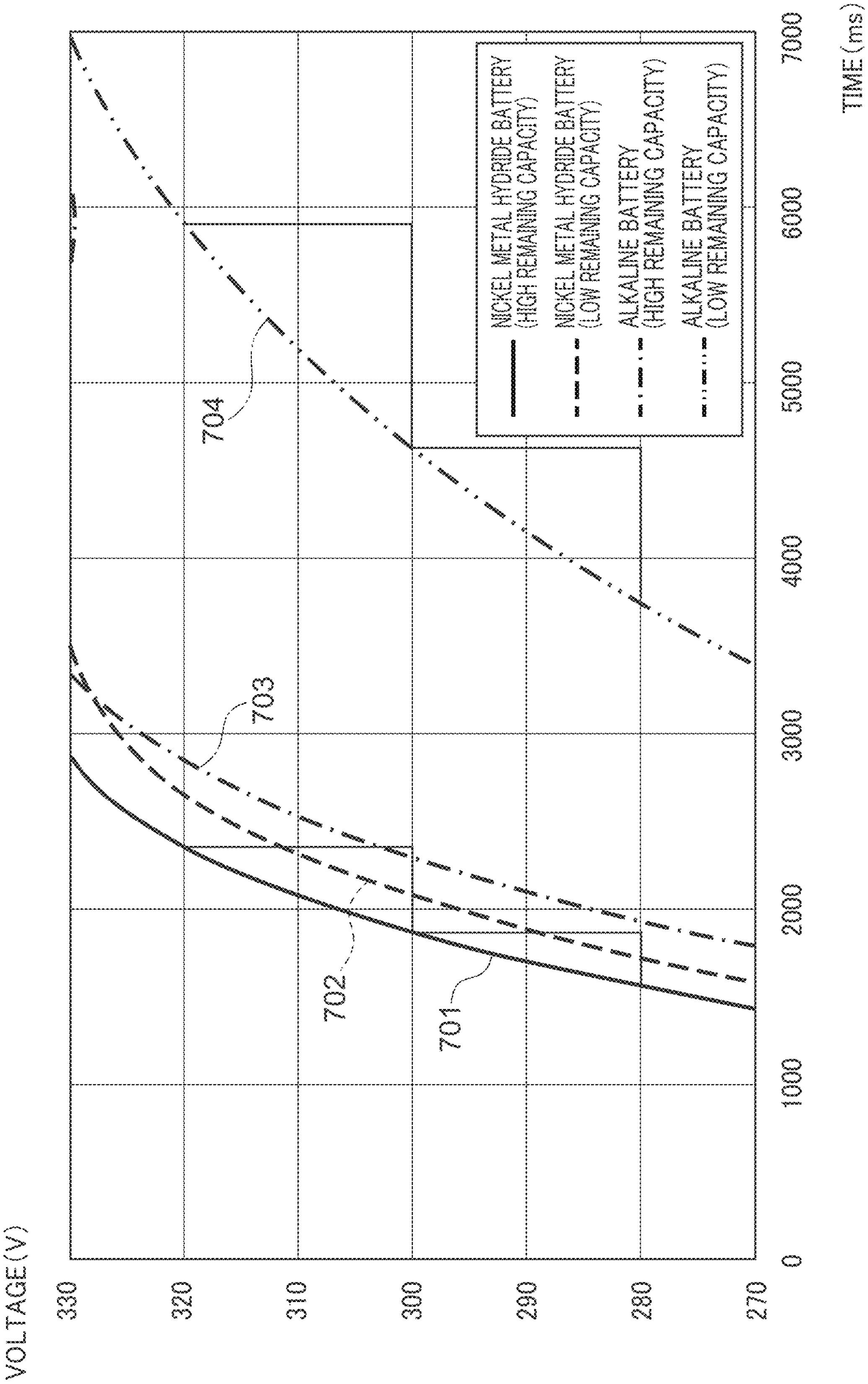
FIG. 8 is a partially enlarged view of FIG. 7.

Next, differences in the charging characteristics in the graphs of FIG. 7 that show the charging characteristics of the respective batteries will be described. FIG. 8 is a partially enlarged view of the graphs 701 to 704 shown in FIG. 7.

By comparing respective gradients of the graphs 701 to 704 when the voltage of the main capacitor 102*d* rises from 280V to 300V, it can be seen that the gradients are equivalent for the three types of batteries except for the alkaline battery with a low remaining battery power, but the gradient for the alkaline battery with a low remaining battery power is smaller than that for the other three types of batteries. The same can be said about the gradient when the voltage charged in the main capacitor 102*d* rises from 300V to 320V.

In addition, it can be seen that the voltage gradient when the voltage of the main capacitor 102*d* rises differs depending on the voltage range (for example, the range of 280V to 300V and the range of 300V to 320V) in one graph (the same battery). Furthermore, it can be seen that the alkaline battery with a low remaining battery power has a smaller voltage gradient than the other batteries in both the range of 280V to 300V and the range of 300V to 320V.

In this way, the voltage rise curve when the charging of the main capacitor 102*d* proceeds depicts a different locus depending on the type of the battery used for charging and the remaining battery power of the battery used for charging. Therefore, in the present embodiment, two ranges (the range of 280V to 300V and the range of 300V to 320V) are provided, and the threshold values for comparison with the voltage gradient ΔAD are provided for each provided range. Next, the relationship between the first to the fourth threshold values that are used for comparison with the voltage gradient ΔAD in the first gradient determination processing and the second gradient determination processing, and the state of the battery 200 will be described.

Figure 9:
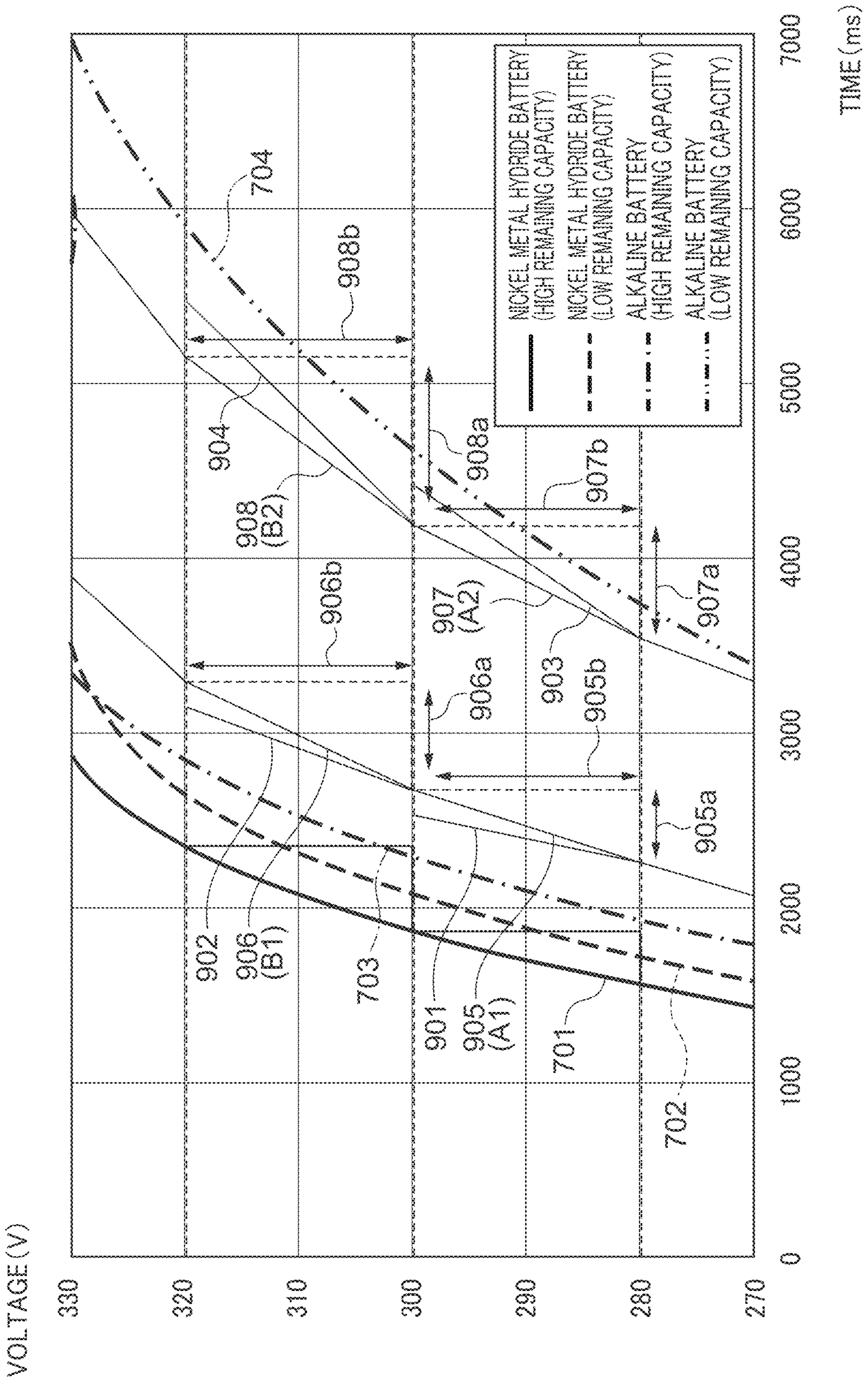
FIG. 9 is a diagram that illustrates a relationship between the type of battery, a voltage of the main capacitor, and a first to a fourth threshold values.

FIG. 9 is a diagram that illustrates the relationship between the type of the battery used for the battery 200, the voltage of the main capacitor 102*d*, and the first to the fourth threshold values. Graphs 701 to 704 in FIG. 9 are the same as the graphs 701 to 704 in FIG. 8, and threshold value straight lines 905 to 908 representing the first to the fourth threshold values are additionally shown in FIG. 9.

The gradient of the threshold value straight line 905 represents the first threshold value, and is defined as a value obtained by dividing a voltage difference 905*b* (=20V) by a predetermined time 905*a* required to boost 20V (the voltage difference 905*b*). Similarly, the gradient of the threshold value straight line 907 represents the second threshold value, and is defined as a value obtained by dividing a voltage difference 907*b* (=20V) by a predetermined time 907*a* required to boost 20V (the voltage difference 907*b*). The gradient of the threshold value straight line 906 represents the third threshold value, and is defined as a value obtained by dividing a voltage difference 906*b* (=20V) by a predetermined time 906*a* required to boost 20V (the voltage difference 906*b*). Similarly, the gradient of the threshold value straight line 908 represents the fourth threshold value, and is defined as a value obtained by dividing a voltage difference 908*b* (=20V) by a predetermined time 908*a* required to boost 20V (the voltage difference 908*b*).

The gradients of the threshold value straight lines 905 and 907 are set as follows. That is, respective approximate straight lines of the graphs 701 to 704 in the voltage range of 280V to 300V of the main capacitor 102*d* are obtained. The threshold value straight line 905 is set by determining the predetermined time 905*a* with respect to the voltage difference 905*b* so that the threshold value straight line 905 becomes a straight line with a gradient slightly smaller than the gradients of the approximate straight lines of the graphs 701 to 703. In addition, the threshold value straight line 907 is set by determining the predetermined time 907*a* with respect to the voltage difference 907*b* so that the threshold value straight line 907 becomes a straight line with a gradient slightly greater than the gradient of the approximate straight line of the graph 704. The method for setting the gradients of the threshold value straight lines 906 and 908 is similar to the method for setting the gradients of the threshold value straight lines 905 and 907, and therefore the description thereof will be omitted.

Next, the first gradient determination processing shown in FIG. 6A and the second gradient determination processing shown in FIG. 6B will be described by using specific examples, where the first threshold value is "A1", the second threshold value is "A2", the third threshold value is "B1", and the fourth threshold value is "B2".

When the power source of the strobe device 100 is turned on (when the power switch is turned on), the light emission processing of the flowchart shown in FIG. 3 is started. The flow in FIG. 3 is a flow that returns to S302 depending on the predetermined determination result or after the process of S314, and when the processing is returned to S302, the voltage value of the main capacitor 102*d* is obtained as the latest previous voltage value in S303.

Next, the first gradient determination processing shown in FIG. 6A and the second gradient determination processing shown in FIG. 6B will be described by taking, as an example, the graph 701 in the case that the battery 200 of the strobe device 100 is a nickel metal hydride battery with a high remaining battery power (a high remaining capacity), that is, the graph 701 in the case that a nickel metal hydride battery has a high remaining battery power.

It is assumed that the voltage gradient ΔAD in the case that a nickel metal hydride battery with a high remaining battery power is used and the previous voltage value is greater than 280V and is equal to or smaller than 300V can be represented by a straight line 901 in FIG. 9. In this case, the gradient of the straight line 901 is greater than that of the threshold value straight line 905. In other words, the value of the voltage gradient ΔAD is greater than the first threshold value A1 corresponding to the threshold value straight line 905. Therefore, in the case that the nickel metal hydride battery with a high remaining battery power is being used, the determination of S602 becomes "NO", and the first gradient determination processing ends.

In addition, it is assumed that the voltage gradient ΔAD in the case that a nickel metal hydride battery with a high remaining battery power is used and the previous voltage value is greater than 300V and is equal to or smaller than 320V can be represented by a straight line 902 in FIG. 9. In this case, the gradient of the straight line 902 is greater than that of the threshold value straight line 906. In other words, the value of the voltage gradient ΔAD is greater than the third threshold value B1 corresponding to the threshold value straight line 906. Therefore, in the case that the nickel metal hydride battery with a high remaining battery power is being used, the determination of S612 becomes "NO", and the second gradient determination processing ends.

It should be noted that in the present embodiment, the same determination result is capable of being obtained in the case of using a nickel metal hydride battery with a low remaining battery power and in the case of using an alkaline battery with a high remaining battery power (in the case that a nickel metal hydride battery has a low remaining battery power and in the case that an alkaline battery has a high remaining battery power).

Next, the first gradient determination processing shown in FIG. 6A and the second gradient determination processing shown in FIG. 6B will be described by taking, as an example, the graph 704 in the case that the battery 200 of the strobe device 100 is an alkaline battery with a low remaining battery power, that is, the graph 704 in the case that an alkaline battery has a low remaining battery power.

It is assumed that the voltage gradient ΔAD in the case that an alkaline battery with a low remaining battery power is used and the previous voltage value is greater than 280V and is equal to or smaller than 300V can be represented by a straight line 903 in FIG. 9. In this case, the gradient of the straight line 903 is smaller than that of the threshold value straight line 905 and that of the threshold value straight line 907. In other words, the value of the voltage gradient ΔAD is smaller than the second threshold value A2 corresponding to the threshold value straight line 907. Therefore, in the case that the alkaline battery with a low remaining battery power is being used, the determination of S602 becomes "YES", the determination of S603 also becomes "YES", and the process of S605 is executed, after which the first gradient determination processing ends.

It is assumed that the voltage gradient ΔAD in the case that an alkaline battery with a low remaining battery power is used and the previous voltage value is greater than 300V and is equal to or smaller than 320V can be represented by a straight line 904 in FIG. 9. In this case, the gradient of the straight line 904 is smaller than that of the threshold value straight line 906 and that of the threshold value straight line 908. In other words, the value of the voltage gradient ΔAD is smaller than the fourth threshold value B2 corresponding to the threshold value straight line 908. Therefore, in the case that the alkaline battery with a low remaining battery power is being used, the determination of S612 becomes "YES", the determination of S613 also becomes "YES", and the process of S615 is executed, after which the second gradient determination processing ends.

When the voltage of the main capacitor 102*d* is in the range of 280V to 320V, the charging characteristic of an alkaline battery with a high remaining battery power (the graph 703) is very similar to the charging characteristic of a nickel metal hydride battery with a high remaining battery power (the graph 701). However, whereas the nickel metal hydride battery only experiences a small decrease in charging performance as the remaining battery power decreases, the alkaline battery experiences a significant decrease in the charging performance as the remaining battery power decreases. Therefore, in the case of using a new alkaline battery (an alkaline battery with a high remaining battery power), the determination of S602 and the determination of S612 will become "NO" at the beginning of use, respectively, but as the number of times of light emission increases and the remaining battery power decreases, the determination of S602 and the determination of S612 will become "YES", respectively. As described with reference to FIG. 7, this indicates that the time required for charging is becoming longer, and therefore the time for which heat is generated due to charging is becoming longer. Therefore, a measure is taken to suppress the temperature rise of the alkaline battery by generating a charging completion waiting time after the next light emission operation. Thus, in the case that the voltage gradient ΔAD is equal to or smaller than the first threshold value A1 or is equal to or smaller than the third threshold value B1, but is greater than the second threshold value A2 or is greater than the fourth threshold value B2 (NO in S603 or NO in S613), a charging completion waiting time is generated after the next light emission operation.

When the remaining battery power of the alkaline battery further decreases, the determination result of S603 or the determination result of S613 becomes "YES", a charging completion waiting time is generated and concurrently a warning is issued. In view of this situation, the warning issued in S605 and the warning issued S615 inform the user that the battery is in a state where the temperature of the battery is likely to rise and that the remaining battery power has dropped.

The respective charging completion waiting times of S604 and S605 may be configured to extend the waiting time in stages in accordance with the voltage gradient ΔAD when the voltage gradient ΔAD is between the first threshold value A1 and the second threshold value A2 and when the voltage gradient ΔAD is smaller than the second threshold value A2. The same can be applied to the respective charging completion waiting times of S614 and S615. This makes it easier to understand the state of the battery 200 when the lighting apparatus (the strobe device 100) is continuously performing the light emission operation.

It should be noted that from the viewpoint of suppressing the temperature rise of the battery, the first gradient determination processing and the second gradient determination processing are not necessary for a nickel metal hydride battery. However, since it is not easy to determine whether the battery being used is an alkaline battery or a nickel metal hydride battery, in the present embodiment, the first gradient determination processing and the second gradient determination processing are performed regardless of the type of the battery 200.

As described above, the graphs 701 to 704 showing the charging characteristics of the main capacitor 102*d*, as shown in FIG. 7, depict different curves (different loci) that are similar to quadratic curves depending on the type of the battery and the remaining battery power of the battery. Therefore, in the present embodiment, a plurality of ranges obtained by separating the voltage of the main capacitor 102*d* by a predetermined potential width are provided, and the first gradient determination processing or the second gradient determination processing is executed depending on which range the previous voltage value belongs to. At this time, the threshold values for determining the voltage gradient ΔAD based on the previous voltage value and the current voltage value are differentiated between the first gradient determination processing and the second gradient determination processing. As a result, it is possible to improve the accuracy of the gradient determination processing. It should be noted that in the present embodiment, the number of the plurality of ranges provided for the voltage of the main capacitor 102*d* is two, but it may be three or more.

In order to further improve the accuracy of the gradient determination processing, the voltage of the main capacitor 102*d* may be divided into more ranges, threshold values may be provided for each range, and the magnitude relationship between the threshold values and the voltage gradient ΔAD may be determined. In addition, a polynomial representing the threshold values may be created based on the voltage curve of the main capacitor 102*d*, which changes according to the capacity of the battery 200 expected to be used, and the threshold values according to the detected current voltage value may be determined from the polynomial. In this case, it is not necessary to perform the range setting for the voltage of the main capacitor 102*d*.

In the present embodiment, the first gradient determination processing and the second gradient determination processing are executed in the case that the previous voltage value of the main capacitor 102*d* is in the range of 280V to 320V, but the gradient determination processing may be executed in the case that the previous voltage value is an arbitrary voltage greater than 0V. This is because, for example, in the case that the minimum voltage value at which charging is determined to be complete is 300V, if the light emission operation is continuously performed at a moment the voltage has reached 300V, there is a possibility that the gradient determination processing will not be performed correctly.

As described above, according to the present embodiment, in the light emission control of the strobe device 100, when the battery 200 is not in a state where it is likely to generate heat, it is possible to perform the light emission without providing a charging completion waiting time that is unnecessary. On the other hand, when the battery 200 is in the state where it is likely to generate heat, it is possible to suppress the temperature rise of the battery 200 by providing a charging completion waiting time. As a result, it is possible to protect the strobe device 100 from the heat generated by the battery 200, and even in the case that the continuous light emission is being performed, the number of times of light emission does not need to be restricted (reduced) more than necessary.

In addition, according to the present embodiment, it is possible to restrict the light emission without stopping the charging circuit, so that it is possible to avoid complicating the control flow. Furthermore, one method of suppressing the temperature rise of the battery 200 is to provide a thermistor, which suppresses the electric current, in the charging circuit, but the resistance of each thermistor component to temperature varies greatly, which can lead to individual differences between strobe devices. On the other hand, in the embodiment described above, the gradient determination (control) is used, so that individual differences between strobe devices do not occur.

It should be noted that in the case that continuous light emission with a small amount of light is performed, the voltage of the main capacitor 102*d* increases or decreases within a certain range, and even in this case, however, it is possible to determine whether or not the battery 200 is in the state where it is likely to generate heat each time the light emission with a small amount of light is performed. In the case that a warning is issued in S605 or S615, this indicates that the remaining battery power of the alkaline battery being used is low, making it easier for the user to determine when to replace the battery 200, etc.

Finally, modifications of the embodiment described above will be described. For example, the processing order in the flowcharts shown in the embodiment described above is merely an example, and the processing order may be changed if there is no inconvenience.

For example, in the embodiment described above, the voltage gradient ΔAD has been obtained based on the previous voltage value and the current voltage value. Instead of this, an elapsed time from when the voltage of the main capacitor 102*d* reaches 280V to when the voltage of the main capacitor 102*d* reaches 300V may be measured by using the timer circuit provided in the FPU 101, and a value obtained by dividing the voltage difference of 20V by the elapsed time may be used as the voltage gradient AD in the first gradient determination processing. Similarly, an elapsed time from when the voltage of the main capacitor 102*d* reaches 300V to when the voltage of the main capacitor 102*d* reaches 320V may be measured by using the timer circuit provided in the FPU 101, and a value obtained by dividing the voltage difference of 20V by the elapsed time may be used as the voltage gradient AD in the second gradient determination processing. The processing contents of S303 and S305 are changed in accordance with this processing content.

In addition, in the embodiment described above, in the case that the voltage gradient ΔAD becomes equal to or smaller than the first threshold value or equal to or smaller than the third threshold value, the charging completion waiting time is immediately generated. Instead of this, the charging completion waiting time may be generated for the first time in the case that the determination that the voltage gradient ΔAD becomes equal to or smaller than the first threshold value or equal to or smaller than the third threshold value continues for a predetermined number of times, and thereafter the charging completion waiting time may be generated depending on the determination result that the voltage gradient ΔAD becomes equal to or smaller than the first threshold value or equal to or smaller than the third threshold value. Furthermore, in the case that a thermometer is provided at a predetermined location inside the strobe device 100 (for example, the light emitting unit 100*b*), the first gradient determination processing and the second gradient determination processing may be performed in the case that a temperature indicated by the thermometer has exceeded a predetermined temperature. In addition, the number of times of light emission or an elapsed time since the power source of the strobe device 100 has been turned on may be taken into consideration as the execution condition for the first gradient determination processing and the second gradient determination processing.

In the embodiment described above, the maximum voltage value of the main capacitor 102*d* has been set to 330V, and in this case, however, there is a voltage range in which the voltage changes (increases or decreases) due to discharging and intermittent charging after the voltage value of the main capacitor 102*d* has reached the maximum voltage value of 330V. Therefore, in this voltage range, since the battery 200 is not always performing the charging operation, it may be determined that the battery 200 is not in a state where it generates heat, and the first gradient determination processing and the second gradient determination processing may not be performed. As a result, it is possible to reduce the load on the FPU 101 in the light emission control processing of FIG. 3.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., ASIC) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-010795, filed on Jan. 29, 2024, which is hereby incorporated by reference herein in its entirety.

What is claimed is:

1. A lighting apparatus comprising:

a light source;

a capacitor that stores energy, which causes the light source to emit light;

at least one processor; and a memory coupled to the processor storing instructions that, when executed by the processor, cause the processor to function as:

a charging unit that charges the capacitor with a battery;

a detecting unit that detects a voltage of the capacitor; and a control unit that controls a light emission operation of the light source based on a change amount of the voltage of the capacitor, wherein the control unit compares the change amount with a predetermined first threshold value, and in a case that the change amount is equal to or smaller than the first threshold value, waits for a predetermined waiting time to elapse after a next time the light source is caused to emit light, and then determines whether or not charging of the capacitor is complete.

2. The lighting apparatus according to claim 1, wherein the control unit compares the change amount with a second threshold value that is predetermined as a value smaller than the first threshold value, and in a case that the change amount is equal to or smaller than the second threshold value, provides the waiting time and concurrently issues a warning.

3. The lighting apparatus according to claim 2, wherein the processor is caused to further function as a setting unit that provides a plurality of ranges obtained by separating the voltage of the capacitor by a predetermined potential width, and sets the first threshold value and the second threshold value for each of the plurality of ranges, and the control unit compares the change amount with the first threshold value and the second threshold value that have been set for a range to which the voltage of the capacitor belongs among the plurality of ranges.

4. The lighting apparatus according to claim 3, wherein the plurality of ranges are provided between a minimum voltage value, at which the light source becomes capable of emitting light, and a maximum voltage value of the capacitor.

5. The lighting apparatus according to claim 1, wherein the control unit, in a case that the change amount is greater than the first threshold value, does not wait for the waiting time to elapse after a next time the light source is caused to emit light, and determines whether or not charging of the capacitor is complete.

6. The lighting apparatus according to claim 1, wherein the control unit, in a case that a determination that the change amount becomes equal to or smaller than the first threshold value continues for a predetermined number of times, causes to generate the waiting time for a first time.

7. The lighting apparatus according to claim 1, wherein a thermometer is provided at a predetermined location inside the lighting apparatus, and the control unit, in a case that a temperature indicated by the thermometer has exceeded a predetermined temperature, executes control of charging of the capacitor based on the change amount of the voltage of the capacitor.

8. A control method for a lighting apparatus, the control method comprising:

a step of obtaining a change amount of a voltage of a capacitor that stores energy, which causes a light source to emit light, when charging the capacitor with a battery;

a step of comparing the change amount with a predetermined first threshold value; and a step of, in a case that the change amount is equal to or smaller than the first threshold value, waiting for a predetermined waiting time to elapse after a next time the light source is caused to emit light, and then determining whether or not charging of the capacitor is complete.

9. A non-transitory computer-readable storage medium storing a program for causing a computer to execute a control method for a lighting apparatus, the control method comprising:

a step of obtaining a change amount of a voltage of a capacitor that stores energy, which causes a light source to emit light, when charging the capacitor with a battery;

a step of comparing the change amount with a predetermined first threshold value; and a step of, in a case that the change amount is equal to or smaller than the first threshold value, waiting for a predetermined waiting time to elapse after a next time the light source is caused to emit light, and then determining whether or not charging of the capacitor is complete.

* * * * *